(12) United States Patent
Miyauchi et al.

(10) Patent No.: US 8,415,064 B2
(45) Date of Patent: Apr. 9, 2013

(54) FUEL CELL SYSTEM

(75) Inventors: Shinji Miyauchi, Nara (JP); Yoshikazu Tanaka, Osaka (JP); Hitoshi Oishi, Osaka (JP); Motomichi Katou, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/811,929

(22) PCT Filed: Jan. 22, 2009

(86) PCT No.: PCT/JP2009/000229
§ 371 (c)(1),
(2), (4) Date: Jul. 7, 2010

(87) PCT Pub. No.: WO2009/093456
PCT Pub. Date: Jul. 30, 2009

(65) Prior Publication Data
US 2010/0279188 A1    Nov. 4, 2010

(30) Foreign Application Priority Data
Jan. 23, 2008 (JP) .................................. 2008-012275

(51) Int. Cl.
*H01M 8/04*    (2006.01)
(52) U.S. Cl. ........................................ 429/429; 429/442
(58) Field of Classification Search ................ None
See application file for complete search history.

(56) References Cited

U.S. PATENT DOCUMENTS

| | | | |
|---|---|---|---|
| 7,101,531 B2 * | 9/2006 | Kamijo | 423/650 |
| 2003/0162065 A1 | 8/2003 | Miyauchi et al. | |
| 2004/0101728 A1 | 5/2004 | Enjoji et al. | |
| 2006/0083968 A1 * | 4/2006 | Inai et al. | 429/24 |
| 2006/0246325 A1 | 11/2006 | Miyauchi et al. | |
| 2007/0141418 A1 | 6/2007 | Ota et al. | |
| 2007/0178347 A1 * | 8/2007 | Siepierski et al. | 429/24 |
| 2009/0176138 A1 | 7/2009 | Miyauchi et al. | |

FOREIGN PATENT DOCUMENTS

| | | |
|---|---|---|
| CN | 1930720 A | 3/2007 |
| JP | 07-019462 | 1/1995 |
| JP | 11-281055 | 10/1999 |

(Continued)

OTHER PUBLICATIONS

Machine translation of JP 2007-194085, Aug. 2007.*

(Continued)

*Primary Examiner* — Jonathan Crepeau
(74) *Attorney, Agent, or Firm* — McDermott Will & Emery LLP

(57) ABSTRACT

A fuel cell system of the present invention includes: a fuel cell (11) configured to generate electric power using a fuel gas and an oxidizing gas; an anode off gas channel (34) through which an anode off gas discharged from an anode (2a) of the fuel cell (11) flows; a gas-liquid separator (10) disposed on the anode off gas channel (34) to separate moisture from the anode off gas, and including a water reservoir (18) configured to store the separated moisture as water; a temperature detector (28) configured to detect a temperature of the water reservoir (18); and an operation allowing device (52) configured not to allow an operation of the fuel cell system in a case where the temperature detected by the temperature detector (28) is equal to or higher than a first threshold that is higher than a standard ambient temperature.

14 Claims, 9 Drawing Sheets

FOREIGN PATENT DOCUMENTS

| | | |
|---|---|---|
| JP | 2003-045471 | 2/2003 |
| JP | 2003-257457 | 9/2003 |
| JP | 2004-171823 | 6/2004 |
| JP | 2006-040553 | 2/2006 |
| JP | 2006-147264 | 6/2006 |
| JP | 2006-228630 | 8/2006 |
| JP | 2006-302792 | 11/2006 |
| JP | 2007-059265 | 3/2007 |
| JP | 3943405 | 4/2007 |
| JP | 2007-194085 | 8/2007 |
| JP | 2008-016320 | 1/2008 |

OTHER PUBLICATIONS

Office Action mailed Nov. 19, 2012 issued in corresponding CN Patent Application No. 200980103009.2 (English translation).

* cited by examiner

FUEL CELL SYSTEM

RELATED APPLICATIONS

This application is the U.S. National Phase under 35 U.S.C. §371 of International Application No. PCT/JP2009/000229, filed on Jan. 22, 2009, which in turn claims the benefit of Japanese Application No. 2008-012275, filed on Jan. 23, 2008, the disclosures of which Applications are incorporated by reference herein.

TECHNICAL FIELD

The present invention relates to control of a fuel cell system, and particularly to control of a protection operation of a fuel cell system against an increase in an outside air temperature.

BACKGROUND ART

A fuel cell system generates electric power by an electrochemical reaction between a fuel gas and an oxidizing gas (each of which is referred to as a "reactant gas") supplied from outside to a fuel cell. At this time, the reaction between these reactant gases generates heat. Therefore, a heat medium is supplied to the fuel cell to maintain the inside of the heated fuel cell at a constant temperature. The heat medium supplied to the inside of the fuel cell exchanges the heat in the fuel cell to be heated and discharged from the fuel cell. The discharged heat medium exchanges the heat in a heat exchanger to be cooled down, and the heat medium is again supplied to the fuel cell.

Known as the fuel cell system configured to cause the heat medium to circulate is a fuel cell power generating system capable of efficiently recovering the heat without increasing the complexity of a heat exchange medium (heat medium) passage (see Patent Document 1, for example). FIG. 8 is a schematic diagram showing a schematic configuration of the fuel cell power generating system disclosed in Patent Document 1.

As shown in FIG. 8, a fuel cell power generating system 200 disclosed in Patent Document 1 includes a fuel cell 201, a reformer 203 having a combustor (burner heater portion) 202, an anode off gas heat exchanger 204, a cathode off gas heat exchanger 205, a cooling water heat exchanger 206, and a hot water tank 207. The heat exchange medium which exchanges the heat with the heat medium (cooling water) discharged from the fuel cell 201 circulates through a circulation passage 208 connecting the anode off gas heat exchanger 204, the cathode off gas heat exchanger 205, the cooling water heat exchanger 206, and the hot water tank 207 in this order. Moreover, in the fuel cell system 200 disclosed in Patent Document 1, the anode off gas heat exchanger 204 recovers the heat by the heat exchange between an anode off gas and the heat exchange medium discharged from the fuel cell 201. Then, the anode off gas after the heat exchange is supplied as a combustion gas through an anode off gas passage 210 to the combustor 202 of the reformer 203. Moreover, water condensed in the anode off gas heat exchanger 206 is supplied to a water tank 209.

Moreover, known as a fuel cell system configured to supply the anode off gas, discharged from the fuel cell, to the combustor as the combustion gas is a fuel cell system configured to supply to the burner (combustor) the anode off gas whose moisture has been removed by a moisture remover (see Patent Document 2, for example). FIG. 9 is a schematic diagram showing a schematic configuration of a fuel cell system disclosed in Patent Document 2.

As shown in FIG. 9, in a fuel cell system 300 disclosed in Patent Document 2, the moisture of the anode off gas discharged from a fuel cell 301 is removed by a moisture remover 302, and the anode off gas is then supplied to a burner 304 of a fuel processor 303. Moreover, in the fuel cell system 300 disclosed in Patent Document 2, the moisture remover 302 is configured to store the removed moisture. Impurity ions contained in the moisture (water) having been removed by the moisture remover 302 are removed by an impurity removing means 305 (to be specific, an ion exchange of the impurity ions is carried out by an ion-exchange resin), and the water from which the impurity ions have been removed is supplied to the fuel processor 303.

Patent Document 1: Japanese Patent No. 3943405
Patent Document 2: Japanese Laid-Open Patent Application Publication No. 2006-147264

DISCLOSURE OF THE INVENTION

Problems to be Solved by the Invention

In the fuel cell power generating system 200 disclosed in Patent Document 1, in a case where an ambient temperature (outside air temperature) around the fuel cell power generating system 200 increases, the moisture evaporated from the water tank 209 by the influence of the increase in the outside air temperature scatters to the anode off gas passage 210 through which the anode off gas flows. This increases a steam partial pressure in the anode off gas passage 210. In this case, as a first problem, there may be a case where in a combustion operation of the combustor 202, the anode off gas containing a larger amount of steam than usual is supplied to the combustor 202, and this causes an abnormality, such as a combustion failure (ignition failure, flame failure after combustion start, or the like).

Similarly, in the fuel cell system 300 disclosed in Patent Document 2, in a case where the ambient temperature (outside air temperature) around the fuel cell system 300 increases, the temperature of the water stored in the moisture remover 302 increases, and this increases the steam partial pressure of the off gas, in the moisture remover 302 and the steam partial pressure of the anode off gas outside the moisture remover 302. In this case, as with the above case, the first problem may occur, that is, the abnormality, such as the combustion failure, may occur.

Moreover, as a second problem, there may be a case where by the increase in the ambient temperature (outside air temperature) around the fuel cell system 300 disclosed in Patent Document 2, the temperature of the water supplied to the impurity removing means 305 increases, the temperature of the water flowing through the impurity removing means 305 exceeds an upper temperature limit of the impurity removing means 305 (ion-exchange resin, for example), and this accelerates the deterioration of the impurity removing means 305.

The present invention was made to solve at least one of the above first and second problems of the above prior arts, and a first object of the present invention is to provide a fuel cell system including: a water reservoir configured to store the moisture separated from the anode off gas by a gas-liquid separator; and a combustor configured to combust the anode off gas, and the fuel cell system capable of suppressing the occurrence of the abnormality (such as a non-ignition abnormality or a flame failure abnormality) caused by a combustion failure of the combustor due to the increase in the steam partial pressure of the anode off gas under a high-temperature environment.

Moreover, a second object of the present invention is to provide a fuel cell system including: a water reservoir configured to store the moisture separated from the anode off gas by a gas-liquid separator; and a purifier configured to purify the moisture (water) in the water reservoir, and the fuel cell system capable of suppressing the deterioration of the purifier due to the increase in the temperature of the water in the water reservoir under a high-temperature environment.

Means for Solving the Problems

In order to solve the above problems, a fuel cell system according to the present invention includes: a fuel cell configured to generate electric power using a fuel gas and an oxidizing gas; an anode off gas channel through which an anode off gas discharged from an anode of the fuel cell flows; a gas-liquid separator disposed on the anode off gas channel to separate moisture from the anode off gas, and including a water reservoir configured to store the separated moisture as water; a temperature detector configured to detect a temperature of the water in the water reservoir; and an operation allowing device configured not to allow an operation of the fuel cell system in a case where the temperature detected by the temperature detector is equal to or higher than a first threshold that is higher than a standard ambient temperature.

With this, at least one of the following two effects can be achieved. It is possible to suppress the abnormality, such as the combustion failure (non-ignition abnormality, flame failure abnormality, or the like), of the combustor of the fuel cell system which abnormality is caused by the increase in the steam partial pressure of the anode off gas under high-temperature environment at least before the start-up of the fuel cell system or during the operation of the fuel cell system (first effect). Moreover, it is possible to suppress the progress of the deterioration of the purifier which deterioration is caused by the flow of the water in the water reservoir at least before the start-up of the fuel cell system or during the operation of the fuel cell system, the water being increased in temperature under high-temperature environment, and this improves the reliability of the fuel cell system (second effect).

Moreover, the fuel cell system according to the present invention may further include a hydrogen generator including a reformer configured to generate the fuel gas from a material by a reforming reaction and a combustor configured to combust the anode off gas supplied through the anode off gas channel to heat the reformer, wherein the first threshold may be a water temperature at which a dew point of the anode off gas existing above the water in the water reservoir is presumed to become equal to or higher than a dew point at which the combustor causes a flame failure.

With this, it is possible to suppress the abnormality, such as the combustion failure (non-ignition abnormality, flame failure abnormality, or the like), of the combustor which abnormality is caused since the water in the water reservoir evaporates under high-temperature environment at least before the start-up of the fuel cell system or during the operation of the fuel cell system, and this increases the steam partial pressure of the anode off gas. Here, the temperature of the water in the water reservoir changes in synchronization with the change in the ambient temperature (outside air temperature) around the fuel cell system. Therefore, the temperature of the water in the water reservoir and the outside air temperature are correlated to each other. On this account, the dew point of the anode off gas can be presumed based on the temperature of the water in the water reservoir.

Moreover, the fuel cell system according to the present invention may further include: a water utilizing device configured to utilize the water in the water reservoir; and a purifier configured to purify the water supplied from the water reservoir to the water utilizing device, wherein the first threshold may be a temperature equal to or lower than an upper temperature limit of the purifier.

With this, the water which is increased in temperature in the water reservoir under high-temperature environment at least before the start-up of the fuel cell system or during the operation of the fuel cell system to exceed the upper temperature limit of the purifier can be prevented from being supplied to the purifier.

Moreover, the fuel cell system according to the present invention may further include a water channel including the water reservoir, wherein the temperature detector may include a water temperature detector configured to detect the temperature of the water in the water channel.

Moreover, in the fuel cell system according to the present invention, the temperature detector may include an outside air temperature detector configured to detect an outside air temperature.

Moreover, in the fuel cell system according to the present invention, the operation allowing device may be configured to allow the operation of the fuel cell system in a case where the temperature detected by the temperature detector is lower than a second threshold that is lower than the first threshold.

Moreover, in the fuel cell system according to the present invention, the operation allowing device may be configured to allow the operation of the fuel cell system in a case where the temperature detected by the temperature detector before start-up of the fuel cell system is lower than first threshold and not lower than the second threshold, and the operation allowing device has already allowed the operation of the fuel cell system.

Moreover, in the fuel cell system according to the present invention, the operation allowing device may be configured not to allow the operation of the fuel cell system until the temperature detected by the temperature detector becomes lower than the second threshold after the temperature detected by the temperature detector has become equal to or higher than the first threshold.

Moreover, the fuel cell system according to the present invention may further include: a material gas supplying device configured to supply the material to the reformer or the combustor; an igniter included in the combustor; and a controller, wherein: the combustor may be configured to combust the material gas supplied from the material gas supplying device in a start-up process; and in the start-up of the fuel cell system after the operation allowing device has allowed the operation of the fuel cell system in a case where the temperature detected by the temperature detector has become equal to or higher than the first threshold and then becomes lower than the second threshold, the controller may control at least one of the material gas supplying device and the igniter such that a larger amount of material gas than usual is supplied to the combustor before an ignition operation of the igniter.

With this, the ignitability at the time of the ignition operation by the igniter of the combustor improves, and a combustion state becomes satisfactory. Thus, the reliability of the fuel cell system improves.

Moreover, in the fuel cell system according to the present invention, the controller may control the material gas supplying device such that a flow rate of the material gas supplied to the combustor becomes higher than usual.

Moreover, in the fuel cell system according to the present invention, the controller may cause the igniter to delay the ignition operation than usual.

Moreover, in the fuel cell system according to the present invention, the controller may control the igniter such that an operating time of the igniter is longer than an operating time in an usual operation.

Moreover, the fuel cell system according to the present invention may further include: a material gas supplying device configured to supply the material to the reformer or the combustor; an igniter included in the combustor; and a controller, wherein: the combustor may be configured to combust the material gas supplied from the material gas supplying device in a start-up process; and in the start-up of the fuel cell system after the operation allowing device has allowed the operation of the fuel cell system in a case where the temperature detected by the temperature detector has become equal to or higher than the first threshold and then becomes lower than the second threshold, the controller may control the igniter such that an ignition operating time of the igniter becomes longer than usual.

Moreover, the fuel cell system according to the present invention may further include a breakdown alarm configured to inform that the fuel cell system is broken in a case where the temperature detected by the temperature detector become equal to or higher than the first threshold in a season other than summer.

There is no possibility that the temperature detected by the temperature detector becomes equal to or higher than the first threshold in a season other than summer. Therefore, in this case, the operation allowing device determines that the fuel cell system is broken, so that an appropriate treatment for recovery from the abnormal state can be carried out by a subsequent maintenance work and the like.

Further, the fuel cell system according to the present invention may further include a disallowing alarm configured to inform disallowance of the operation of the fuel cell system in a case where the operation allowing device does not allow the operation of the fuel cell system.

With this, the user can understand the reason why at least one of the start-up and operation of the fuel cell system is not carried out. Thus, the usability of the fuel cell system becomes satisfactory.

The above object, other objects, features and advantages of the present invention will be made clear by the following detailed explanation of preferred embodiments with reference to the attached drawings.

Effects of the Invention

In accordance with the fuel cell system of the present invention, the occurrence of the failure that is at least one of the occurrence of the abnormality, such as the combustion failure (non-ignition, flame failure, or the like), of the combustor and the progress of the deterioration of the purifier under high-temperature environment at least before the start-up and during the operation can be suppressed. Thus, the reliability of the fuel cell system improves.

Figure 1:
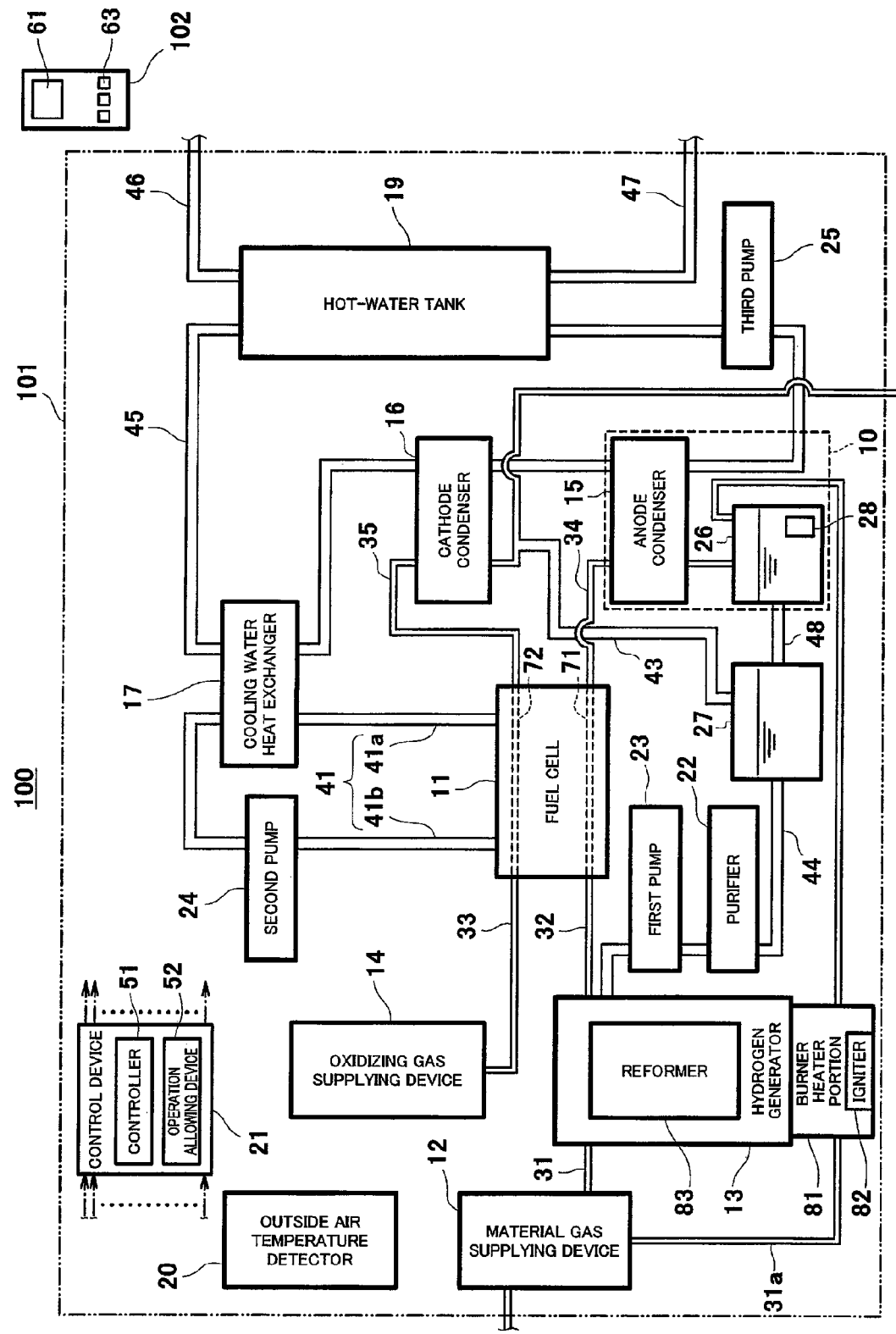
FIG. 1 is a functional block diagram of a fuel cell system according to Embodiment 1 of the present invention.

EXPLANATION OF REFERENCE NUMBERS 1 polymer electrolyte membrane
2$a$ anode
2$b$ cathode
3 MEA (Membrane-Electrode-Assembly; polymer electrolyte membrane-electrode assembly)
4 gasket
5$a$ anode separator
5$b$ cathode separator
6 fuel gas channel
7 oxidizing gas channel
8 cooling water channel
9 cell
10 gas-liquid separator
11 fuel cell
12 material gas supplying device
13 hydrogen generator
14 oxidizing gas supplying device
15 anode condenser
16 cathode condenser
17 cooling water heat exchanger
18 recovered water tank
19 hot-water tank
20 outside air temperature detector
21 control device
22 purifier
23 first pump
24 second pump
25 third pump
26 anode recovered water tank (water reservoir)
27 cathode recovered water tank
28 temperature detector
31 material gas supplying passage
31$a$ combustion gas supplying passage
32 fuel gas supplying passage
33 oxidizing gas supplying passage
34 anode off gas supplying passage (anode off gas channel)
35 oxidizing gas discharging passage
41 cooling water circulating passage
41$a$ cooling water outward route
41$b$ cooling water return route
42 anode recovered water channel 43 cathode recovered water channel
44 reforming water supplying passage
45 exhaust heat recovery circulating passage
46 hot water supplying passage
48 connecting channel
51 controller
52 operation allowing device
61 display portion
62 abnormality alarm
63 key operating portion
71 fuel gas internal channel
72 oxidizing gas internal channel
81 burner heater portion
82 igniter
83 reformer
90 cell stack
100 fuel cell system
101 casing
102 remote controller
200 fuel cell power generating system
201 fuel cell
202 combustor
203 reformer
204 anode off gas heat exchanger
205 cathode off gas heat exchanger
206 cooling water heat exchanger
207 hot water tank
208 circulation passage
209 water tank
210 anode off gas passage
300 fuel cell system
301 fuel cell
302 moisture remover
303 fuel processor
304 burner
305 impurity removing means

BEST MODE FOR CARRYING OUT THE INVENTION

Hereinafter, preferred embodiments of the present invention will be explained in reference to the drawings. In the drawings, the same reference numbers are used for the same or corresponding portions, and a repetition of the same explanation is avoided.

Embodiment 1

Configuration of Fuel Cell System

FIG. 1 is a functional block diagram of a fuel cell system according to Embodiment 1 of the present invention.

As shown in FIG. 1, a fuel cell system 100 according to Embodiment 1 of the present invention includes a casing 101 in which a fuel cell 11 and the like are arranged and a remote controller 102. The fuel cell system 100 is configured to be able to start and stop its operation by operating the remote controller 102.

First, the configuration inside the casing 101 will be explained.

Arranged inside the casing 101 are the fuel cell 11, a material gas supplying device 12, a hydrogen generator 13, an oxidizing gas supplying device 14, an anode condenser 15, a cathode condenser 16, a cooling water heat exchanger 17, an anode recovered water tank 26, a hot-water tank 19, an outside air temperature detector 20, and a control device 21. The fuel cell 11 in the fuel cell system 100 according to Embodiment 1 is constituted by a polymer electrolyte fuel cell. The fuel cell 11 is constituted by a cell stack formed such that plate-shaped cells 9 are stacked in a thickness direction of the cell 9. The fuel cell 11 is not limited to the polymer electrolyte fuel cell, and may be a fuel cell, such as a phosphoric-acid fuel cell.

Figure 2:
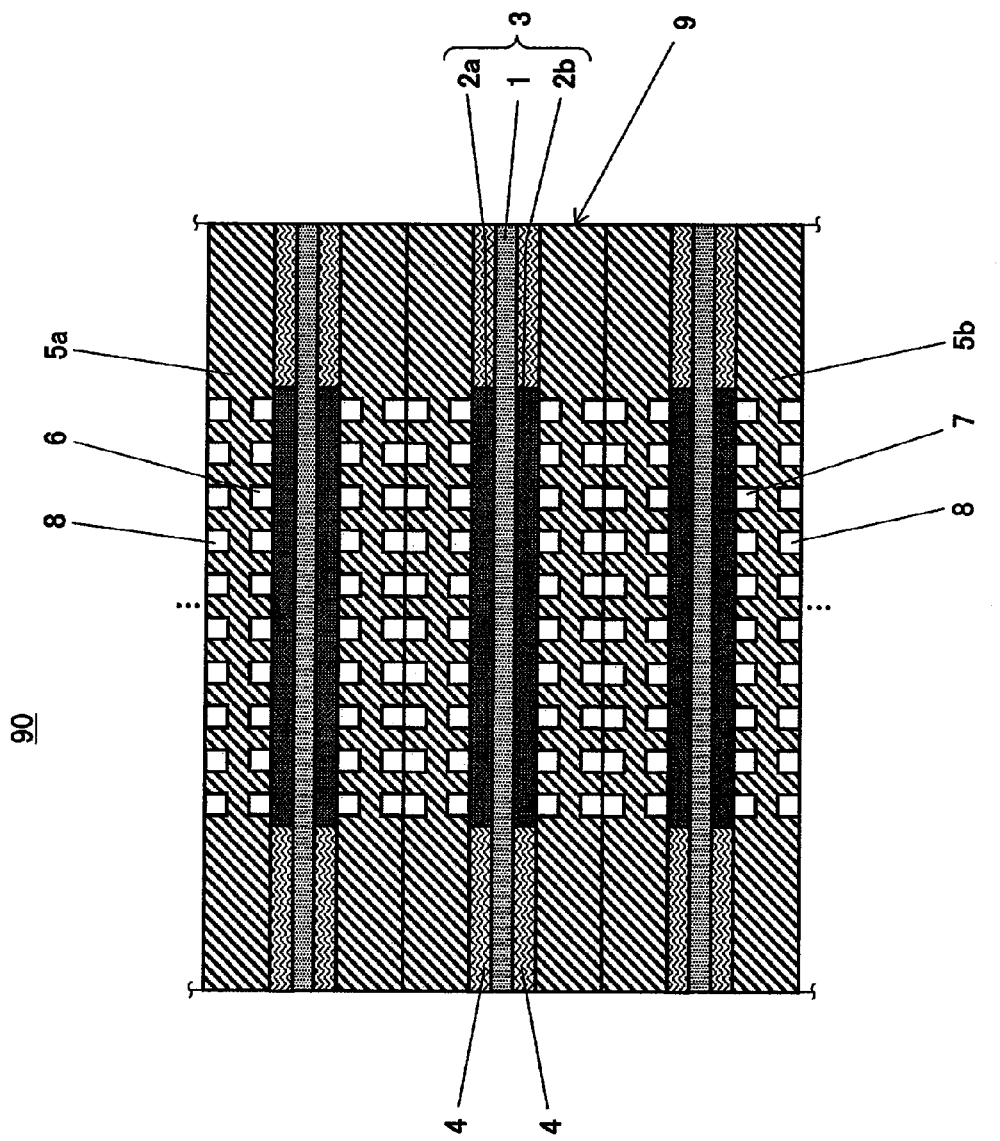
FIG. 2 is a cross-sectional view schematically showing a schematic configuration of a cell stack of a fuel cell in the fuel cell system shown in FIG. 1.

Here, the configuration of the fuel cell 11 will be explained in detail in reference to FIG. 2. FIG. 2 is a cross-sectional view schematically showing a schematic configuration of the cell stack of the fuel cell 11 in the fuel cell system 100 shown in FIG. 1.

As shown in FIG. 2, the cell 9 includes an MEA 3 (Membrane-Electrode-Assembly; polymer electrolyte membrane-electrode assembly), gaskets 4, an anode separator 5a, and a cathode separator 5b. The MEA 3 includes a polymer electrolyte membrane 1 which selectively transports hydrogen ions, an anode 2a, and a cathode 2b. The anode 2a and the cathode 2b (each of which is referred to as a "gas diffusion electrode") are respectively disposed on both surfaces of the polymer electrolyte membrane 1 such that each of the anode 2a and the cathode 2b is located on not a peripheral portion of the surface of the polymer electrolyte membrane 1 but an inner region of the surface of the polymer electrolyte membrane 1.

Moreover, a pair of ring-shaped rubber gaskets 4 are respectively disposed around the anode 2a and the cathode 2b so as to sandwich the polymer electrolyte membrane 1. The anode separator 5a having electrical conductivity and the cathode separator 5b having electrical conductivity are disposed to sandwich the MEA 3 and the gaskets 4. A groove-like fuel gas channel 6 through which a fuel gas flows is formed on a main surface (hereinafter referred to as an "inner surface") of the anode separator 5a which surface contacts the MEA 3. A groove-like oxidizing gas channel 7 through which an oxidizing gas flows is formed on a main surface (hereinafter referred to as an "inner surface") of the cathode separator 5b which surface contacts the MEA 3. Moreover, a cooling water channel 8 through which cooling water flows is formed on an outer surface of each of the anode separator 5a and the cathode separator 5b (which are hereinafter referred to as the "separators 5a and 5b").

A fuel gas supplying manifold hole, a fuel gas discharging manifold hole, an oxidizing gas supplying manifold hole, an oxidizing gas discharging manifold hole, a cooling water supplying manifold hole, and a cooling water discharging manifold hole (all of which are not shown) which are through holes extending in the thickness direction are formed at a peripheral portion of each of the polymer electrolyte membrane 1, the gaskets 4, and the separators 5a and 5b.

By stacking such cells 9 in the thickness direction, a cell stack body is formed. Then, by placing a current collector, an insulating plate, and an end plate (all of which are not shown) on each of both ends of the cell stack body, and fastening these components by fasteners (not shown), a cell stack 90 is formed. By stacking the cells 9, the manifold holes, such as the fuel gas supplying manifold hole, formed on the polymer electrolyte membrane 1, the gaskets 4, and the separators 5a and 5b are connected to one another in the thickness direction to form manifolds, such as a fuel gas supplying manifold. The fuel gas supplying manifold, a fuel gas discharging manifold, and the fuel gas channels 6 formed on the respective anode separators 5a to connect the fuel gas supplying manifold and the fuel gas discharging manifold constitute a fuel gas internal channel 71 (see FIG. 1). An oxidizing gas supplying manifold, an oxidizing gas discharging manifold, and the oxidizing gas channels 7 formed on the respective cathode separators 5b to connect the oxidizing gas supplying manifold and the oxidizing gas discharging manifold constitute an oxidizing gas internal channel 72 (see FIG. 1). A cooling water supplying manifold, a cooling water discharging manifold, and the cooling water channels 8 formed on the respective separators 5a and 5b to connect the cooling water supplying manifold and the cooling water discharging manifold constitute a cooling water internal channel (not shown).

Next, the configurations of respective devices arranged inside the casing 101 will be explained in reference to FIG. 1.

The hydrogen generator 13 includes a burner heater portion 81 that is a combustor of the present invention and a reformer 83. The burner heater portion 81 includes an igniter 82. A combustion gas supply port (not shown) of the burner heater portion 81 is connected to a downstream end of the fuel gas internal channel 71 of the fuel cell 11 via a below-described anode off gas supplying passage (anode off gas channel) 34, and a surplus fuel gas unconsumed in the anode 2a of the fuel cell 11 is supplied as an off gas (combustion gas). Moreover, the material gas supplying device 12 is connected to the burner heater portion 81 via a combustion gas supplying passage 31a, and a material gas is supplied to the burner heater portion 81 when, for example, the fuel cell system 100 starts up. Further, a combustion air supplying device (not shown) is connected to the burner heater portion 81 via a combustion air supplying passage, not shown, and combustion air is supplied to the burner heater portion 81.

With this, the burner heater portion 81 causes the igniter 82 to ignite and combust the anode off gas (or the material gas supplied through the combustion gas supplying passage 31a) supplied from the anode 2a of the fuel cell 11 through the fuel gas internal channel 71 and the anode off gas supplying passage 34 and the combustion air supplied through the combustion air supplying passage, thereby generating a combustion gas.

A material gas supplying passage 31 through which the material gas (city gas, for example) is supplied from the outside of the fuel cell system 100 (to be precise, the casing 101) is connected to a material gas supply port (not shown) of the hydrogen generator 13. The material gas supplying device 12 is disposed on a portion of the material gas supplying passage 31 and adjusts the flow rate of the material gas to be supplied to the hydrogen generator 13.

Further, a cathode recovered water tank 27 is connected to a reforming water supply port (not shown) of the hydrogen generator 13 via a below-described reforming water supplying passage 44. A purifier 22 configured to remove impurities from recovered water and a first pump 23 capable of adjusting the flow rate are respectively disposed on portions of the reforming water supplying passage 44. With this, the water (recovered water) recovered in the cathode recovered water tank 27 is supplied to the purifier 22 by the first pump 23, the impurities in the recovered water are removed by the purifier 22, and the water having flowed through the purifier 22 is supplied to the reformer 83 of the hydrogen generator 13. In the present embodiment, an ion-exchange resin is used in the purifier 22. However, the present embodiment is not limited to this. Any impurity remover, such as activated carbon or zeolite, may be used as long as the impurities in the recovered water tank can be removed.

Then, the hydrogen generator 13 utilizes the heat transferred from the combustion gas generated by the burner heater portion 81 to carry out, in the reformer 83, a reforming reaction between the material gas supplied through the material gas supplying passage 31 and the water supplied through the reforming water supplying passage 44. Thus, a hydrogen-rich reformed gas is generated. The generated reformed gas is subjected to a shift reaction and an oxidation reaction in a shift converter and a CO remover, which are not shown. Thus, a hydrogen-rich fuel gas whose carbon monoxide is reduced to about 10 ppm is generated, and such fuel gas is supplied to the fuel cell 11.

An upstream end of the fuel gas internal channel 71 of the fuel cell 11 is connected to a fuel gas outlet port (not shown) of the hydrogen generator 13 via a fuel gas supplying passage 32, and an upstream end of the oxidizing gas internal channel 72 of the fuel cell 11 is connected to an oxidizing gas supply port (not shown) of the oxidizing gas supplying device 14 via an oxidizing gas supplying passage 33. Herein, the oxidizing gas supplying device 14 is constituted by a blower (not shown) and a humidifier (not shown). The blower has an inlet port which is open to the atmosphere. The humidifier humidifies suctioned air using a certain amount of steam. The oxidizing gas supplying device 14 is configured to supply the oxidizing gas to the fuel cell 11. The oxidizing gas supplying device 14 may be configured to use a fan, such as a sirocco fan. With this, the fuel cell 11 causes the fuel gas supplied from the hydrogen generator 13 and the oxidizing gas supplied from the oxidizing gas supplying device 14 to electrochemically react with each other to generate water, heat, and electricity.

A cooling water circulating passage 41 is connected to the fuel cell 11. A second pump 24 capable of adjusting the flow rate is disposed on a portion of the cooling water circulating passage 41. The cooling water circulating passage 41 includes a cooling water outward route 41a and a cooling water return route 41b. An upstream end of the cooling water outward route 41a is connected to an exit (not shown) of a primary channel of the cooling water heat exchanger 17, and a downstream end thereof is connected to a cooling water supply port (not shown) of the fuel cell 11. Moreover, an upstream end of the cooling water return route 41b is connected to a cooling water outlet port (not shown) of the fuel cell 11, and a downstream end thereof is connected to an entrance (not shown) of the primary channel of the cooling water heat exchanger 17. With this, the cooling water supplied to the fuel cell 11 recovers the heat generated when the reactant gases react with each other. Thus, the internal temperature of the fuel cell 11 can be maintained at an appropriate temperature. The cooling water having recovered the heat generated in the fuel cell 11 is cooled down by the heat exchange in the cooling water heat exchanger 17 with the heat medium (hot water) flowing through a below-described secondary channel of the cooling water heat exchanger 17.

As described above, an upstream end of the anode off gas supplying passage 34 is connected to the downstream end of the fuel gas internal channel 71 of the fuel cell 11, and a downstream end thereof is connected to an off gas supply port of the burner heater portion 81. A gas-liquid separator 10 constituted by the anode condenser 15 and the anode recovered water tank (water reservoir) 26 is disposed on a portion of the anode off gas supplying passage 34. A primary channel of the anode condenser 15 and a pipe constituting the anode off gas supplying passage 34 are connected to each other. Moreover, the anode recovered water tank 26 is connected to a portion of the anode off gas supplying passage 34 which portion is located downstream of the anode condenser 15. More specifically, two pipes constituting the anode off gas supplying passage 34 are connected to an upper portion of the anode recovered water tank 26. One of these two pipes is disposed to connect the anode condenser 15 and the upper portion of the anode recovered water tank 26, and the other pipe is disposed to connect the upper portion of the anode recovered water tank 26 and the burner heater portion 81.

With this, the surplus fuel gas (anode off gas) unconsumed in the anode 2a of the fuel cell 11 exchanges the heat in the anode condenser 15 with the heat medium (hot water) flowing through a below-described secondary channel of the anode condenser 15. Thus, the steam contained in the anode off gas is condensed. The condensed water is stored in the anode recovered water tank 26 as the recovered water. Meanwhile, the anode off gas whose steam is reduced by the condensation is supplied to the burner heater portion 81.

A temperature detector (thermistor, for example) 28 is provided inside the anode recovered water tank 26. The temperature detector 28 detects the temperature of the recovered water stored inside the anode recovered water tank 26, and the below-described control device 21 is configured to obtain the water temperature detected by the temperature detector 28. The anode recovered water tank 26 is connected to the cathode recovered water tank 27 by a connecting channel 48. A valve (not shown) configured to open and close a channel is disposed on the connecting channel 48. The control device 21 opens the valve, not shown, when the amount of recovered water stored in the anode recovered water tank 26 reaches a predetermined amount. With this, the recovered water stored in the anode recovered water tank 26 is supplied to the cathode recovered water tank 27. Then, as described above, the recovered water in the cathode recovered water tank 27 is supplied to the purifier 22. To be specific, the recovered water in the recovered water tank 27 that is the water reservoir of the gas-liquid separator flows through the purifier 22.

An oxidizing gas discharging passage 35 is connected to the fuel cell 11. Specifically, an upstream end of the oxidizing gas discharging passage 35 is connected to a downstream end of the oxidizing gas internal channel 72 of the fuel cell 11, and a downstream end thereof is open to the outside of the fuel cell system 100 (casing 101). The cathode condenser 16 is disposed on a portion of the oxidizing gas discharging passage 35. A secondary channel of the cathode condenser 16 and a pipe constituting the oxidizing gas discharging passage 35 are connected to each other. Moreover, an upstream end of a cathode recovered water channel 43 is connected to a portion of the oxidizing gas discharging passage 35 which portion is located downstream of the cathode condenser 16, and a downstream end thereof is connected to the cathode recovered water tank 27.

With this, the surplus oxidizing gas unconsumed in the cathode 2b of the fuel cell 11 exchanges the heat in the cathode condenser 16 with the heat medium (hot water) flowing through a below-described secondary channel of the cathode condenser 16. Thus, the steam contained in the oxidizing gas is condensed. The condensed water is separated from the gas by a suitable means and flows through the cathode recovered water channel 43 to be stored in the cathode recovered water tank 27 as the recovered water. Meanwhile, the oxidizing gas whose steam is reduced by the condensation is discharged to the outside of the fuel cell system 100.

The hot-water tank 19 is provided inside the casing 101. Herein, the hot-water tank 19 is formed to extend in a vertical direction. A so-called stacked boil-up type hot-water tank is used as the hot-water tank 19. An exhaust heat recovery circulating passage 45 is connected to the hot-water tank 19. Specifically, an upstream end of the exhaust heat recovery circulating passage 45 is connected to a lower portion of the hot-water tank 19, and a downstream end thereof is connected to an upper portion of the hot-water tank 19. A third pump 25 capable of adjusting the flow rate is disposed on a portion of the exhaust heat recovery circulating passage 45. Moreover, the anode condenser 15, the cathode condenser 16, and the cooling water heat exchanger 17 are disposed on portions of the exhaust heat recovery circulating passage 45 in this order, each of respective secondary channels of the anode condenser 15, the cathode condenser 16, and the cooling water heat exchanger 17 and a pipe constituting the exhaust heat recovery circulating passage 45 are connected to each other.

With this, while the low-temperature heat medium (hot water) stored in the lower portion of the hot-water tank 19 flows through the exhaust heat recovery circulating passage 45, the heat medium exchanges the heat in the anode condenser 15, the cathode condenser 16, and the cooling water heat exchanger 17 to be heated, and the heat medium is supplied to an upper portion of the hot-water tank 19 as the high-temperature heat medium (boiling water). At this time, since the heat exchange is carried out in the anode condenser 15 between the lowest-temperature heat medium and the anode off gas, the steam in the anode off gas is adequately condensed, and the gas whose steam is adequately reduced is supplied to the burner heater portion 81.

A hot water supplying passage 46 through which the boiling water stored in the hot-water tank 19 is supplied to users is connected to the upper portion of the hot-water tank 19. Moreover, a water supplying passage 47 through which the city water is supplied is connected to the lower portion of the hot-water tank 19. In a case where the amount of water stored in the hot-water tank 19 is smaller than a predetermined amount, a predetermined amount of city water is supplied to the hot-water tank 19.

The outside air temperature detector 20 and the control device 21 are provided inside the casing 101. Herein, the outside air temperature detector 20 is constituted by a thermistor and detects an outside air temperature around the fuel cell system 100. The control device 21 is configured to obtain the outside air temperature detected by the outside air temperature detector 20.

The control device 21 includes a controller 51 and an operation allowing device 52. The control device 21 is constituted by a computer, such as a microcomputer, and includes a CPU, an internal memory constituted by a semiconductor memory, a communication portion, and a clock portion having a calendar function (all of which are not shown). The controller 51 and the operation allowing device 52 are realized by predetermined software stored in the internal memory.

The operation allowing device 52 obtains the temperature of the water stored in the anode recovered water tank 26 which temperature is detected by the temperature detector 28. Then, the operation allowing device 52 determines whether to allow the operation of the fuel cell system 100 based on the obtained temperature. The operation allowing device 52 outputs a predetermined control signal to the below-described remote controller 102 to control the display of information regarding an operation allowance in a display portion 61. Based on the result of the determination of the operation allowing device 52, the controller 51 outputs a control signal to the material gas supplying device 12 and/or the igniter 82 to control the material gas supplying device 12 and/or the igniter 82. Herein, the operation allowing device 52 is configured to directly output the control signal to the remote controller 102 to carry out display control of the information regarding the operation allowance in the display portion 61. However, the present embodiment is not limited to this. The operation allowing device 52 may output the control signal to the controller 51, and the controller 51 may control the display of the information regarding the operation allowance in the display portion 61 of the remote controller 102.

Then, the controller 51 processes the information and carry out various control regarding the fuel cell system including the above control. Operation allowing control and operation disallowing control of the operation allowing device 52 and control of the material gas supplying device 12 and/or the igniter 82 by the controller 51 will be described later.

Here, in the present specification, the control device denotes not only a single controller but also a group of controllers which execute control operations of the fuel cell system 100 in cooperation with one another. Therefore, the control device 21 does not have to be constituted by a single controller and may be constituted by a plurality of controllers which are dispersively arranged and control the fuel cell system 100 in cooperation with one another.

Next, the remote controller 102 provided outside the casing 101 will be explained.

The remote controller 102 includes a control portion (not shown) constituted by a microcomputer, a communication portion (not shown), the display portion 61, and a key operating portion 63. The control portion controls the communication portion and the like. Moreover, in the remote controller 102, the communication portion receives the control signal, and the control portion processes the control signal and transfers the control signal to the display portion 61. With this, the display portion 61 displays that the operation of the fuel cell system 100 is not allowed (for example, "Protection Operation in Progress" is displayed) or that the operation of the fuel cell system 100 is allowed (for example, "Protection Operation in Progress" is not displayed). Therefore, the remote controller 102 corresponds to a disallowing alarm of the present invention.

An operation signal input through the key operating portion 63 of the remote controller 102 is transmitted through the control portion and communication portion of the remote controller 102 to the control device 21. The communication portion of the control device 21 receives the operation signal and transfers the operation signal to the controller 51 or the operation allowing device 52.

In the following explanation, for ease of explanation, regarding signal transmission and reception between the control device 21 and the remote controller 102, communication between the communication portion of the control device 21 and the communication portion of the remote controller 102 and the processing of the control portion of the remote controller 102 are omitted.

Operations of Fuel Cell System

The operations of the fuel cell system 100 according to Embodiment 1 will be explained. Since general operations of the fuel cell system 100 are known, detailed explanations thereof are omitted.

First, operation control of the operation allowing device 52 of the fuel cell system 100 according to Embodiment 1 will be explained in detail in reference to FIG. 3.

Figure 3:
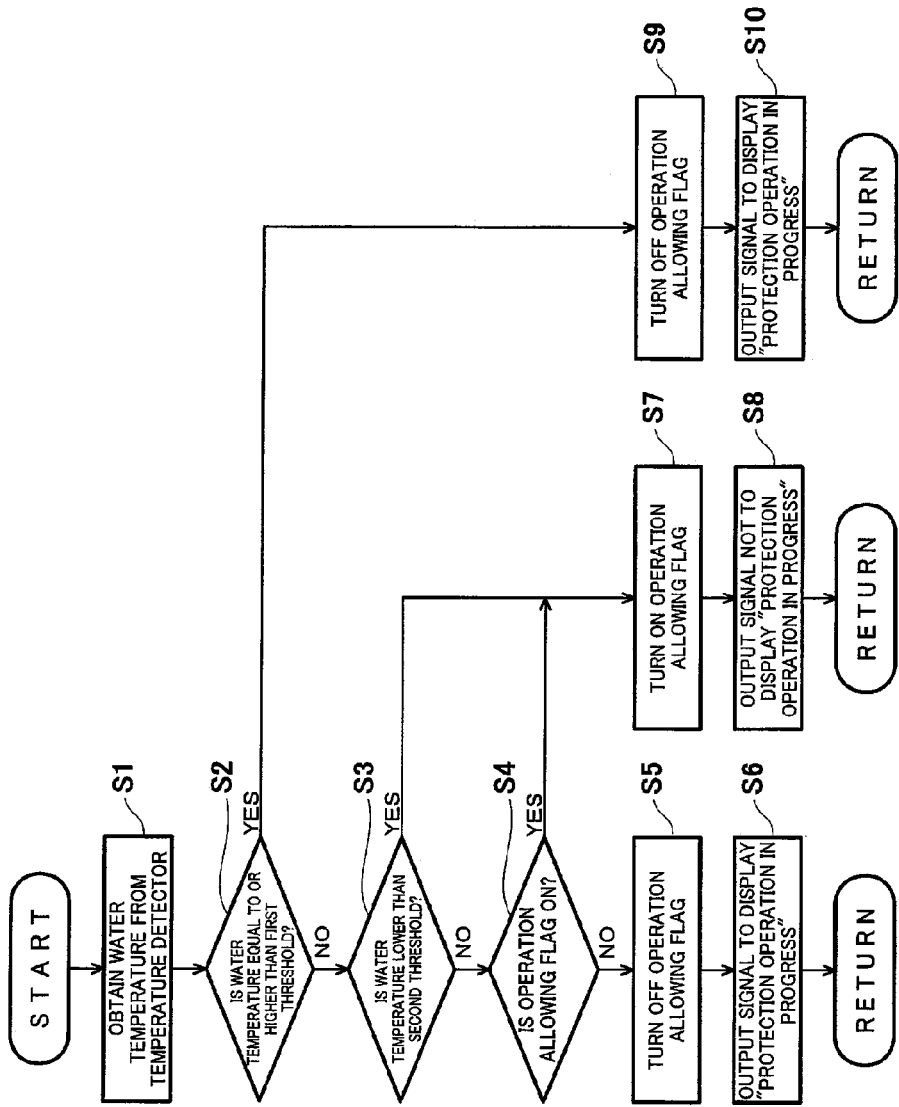
FIG. 3 is a flow chart schematically showing steps of an operation allowing process of the fuel cell system according to Embodiment 1 of the present invention.

FIG. 3 is a flow chart schematically showing steps of an operation allowing process of the fuel cell system 100 according to Embodiment 1.

First, the operation allowing device 52 obtains the water temperature detected by the temperature detector 28 (Step S1). Next, the operation allowing device 52 compares a first threshold stored in the internal memory with the water temperature obtained in Step S1 (Step S2).

Here, the first threshold is defined as a value which satisfies at least one of two conditions described below. As a first condition, it is preferable that the first threshold be (I) a temperature higher than a standard ambient temperature and such a temperature (45° C., for example) of the water in the anode recovered water tank 26 that a dew point of the anode off gas existing above the recovered water in the anode recovered water tank 26 and introduced to the burner heater portion 81 is presumed to become equal to or higher than a dew point at which the burner heater portion 81 causes a flame failure. Since the steam partial pressure of the anode off gas existing above the recovered water is proportional to the temperature of the recovered water, the dew point of the anode off gas flowing into the burner heater portion 81 can be presumed based on the temperature of the water in the anode recovered water tank 26. Moreover, since the temperature of the water in the anode recovered water tank 26 and the outside air temperature are correlated to each other, the dew point of the anode off gas flowing into the burner heater portion 81 may be presumed based on the temperature detected by the outside air temperature detector 20. Here, in the case of detecting the temperature by the outside air temperature detector 20, the first threshold is suitably set to a temperature higher than the standard ambient temperature and such an outside air temperature that the dew point of the anode off gas introduced to the burner heater portion 81 is presumed to become equal to or higher than the dew point at which the burner heater portion 81 causes the flame failure. By setting the first threshold as above, it is possible to suppress the abnormality, such as the combustion failure (non-ignition abnormality, flame failure abnormality, or the like), of the combustor of the fuel cell system 100 which abnormality is caused by the increase in the steam partial pressure of the anode off gas supplied to the burner heater portion 81 under the high-temperature environment at least before the start-up of the fuel cell system 100 or during the operation of the fuel cell system 100.

As a second condition, it is preferable that the first threshold be (II) a temperature which is higher than the standard ambient temperature and equal to or lower than an upper temperature limit (50° C., for example) of the purifier 22. As described above, since the temperature of the water in the anode recovered water tank 26 and the outside air temperature are correlated to each other, the temperature of the recovered water in the anode recovered water tank 26 may be presumed based on the temperature detected by the outside air temperature detector 20. Here, in the case of detecting the temperature by the outside air temperature detector 20, the first threshold is suitably set to a temperature higher than the standard ambient temperature and such an outside air temperature that the temperature of the water in the anode recovered water tank 26 is presumed to become equal to or lower than the upper temperature limit (50° C., for example) of the purifier 22.

By setting the first threshold as above, it is possible to suppress the deterioration of the purifier 22 which deterioration progresses by the flow of the recovered water whose temperature is increased under the high-temperature environment before the start-up of the fuel cell system 100 or during the operation of the fuel cell system 100.

It is more preferable that the first threshold be set to satisfy both conditions (I) and (II) (45° C., for example). This is because both the effect obtained when the first threshold satisfies the condition (I) and the effect obtained when the first threshold satisfies the condition (II) are expected to be realized. In addition, the first threshold satisfying the condition (I) and the first threshold satisfying the condition (II) may be temperature values which are different from each other or are the same as each other.

The following will specifically explain the operation allowing process of the operation allowing device 52 when the water temperature detected by the temperature detector 28 is (i) lower than a second threshold (40° C., for example) that is a temperature lower than the first threshold, (ii) a temperature which has been lower than the second threshold but becomes not lower than the second threshold and lower than the first threshold, (iii) equal to or higher than the first threshold, and (iv) a temperature which has been equal to or higher than the first threshold but becomes lower than the first threshold and not lower than the second threshold.

(i) When Water Temperature is Lower Than Second Threshold

When the water temperature obtained in Step S1 is lower than the second threshold, the process proceeds from Step S2 to Step S3. In Step S3, the operation allowing device 52 compares the second threshold stored in the internal memory with the water temperature obtained in Step S1. Herein, since the water temperature is lower than the second threshold, the process proceeds to Step S7.

In Step S7, the operation allowing device 52 turns ON an operation allowing flag. At this time, when a predetermined start-up condition is satisfied, the controller 51 starts the operation of the fuel cell system 100. For example, when a user operates the key operating portion 63 of the remote controller 102 to instruct the operation start of the fuel cell system 100, and an operation start request signal is input from the control portion of the remote controller 102 to the controller 51, the controller 51 starts the operation of the fuel cell system 100. Moreover, in a case where the fuel cell system 100 is in operation, the controller 51 continues the operation.

Next, the operation allowing device 52 outputs to the remote controller 102 a signal which prevents the display portion 61 from displaying "Protection Operation in Progress" (Step S8). With this, the display portion 61 of the remote controller 102 does not display "Protection Operation in Progress".

Then, the process returns to "Start".

(ii) When Water Temperature is Temperature Which Has Been Lower Than Second Threshold but Becomes Not Lower Than Second Threshold and Lower Than First Threshold When the water temperature obtained in Step S1 is not lower than the second threshold and lower than the first threshold, the process proceeds from Step S2 to Step S3. In Step S3, the operation allowing device 52 compares the second threshold stored in the storage portion with the water temperature obtained in Step S1. Herein, since the outside air temperature is not lower than the second threshold, the process proceeds to Step S4.

In Step S4, the operation allowing device 52 determines whether or not the operation allowing flag is ON. As described above, when the water temperature is lower than the second threshold, the operation allowing flag is turned ON in Step S7. Therefore, when the water temperature which has been lower than the second threshold becomes not lower than the second threshold and lower than the first threshold, the process proceeds to Step S7 since the operation allowing flag is ON.

In Step S7, as with the above (i), the operation allowing device 52 turns ON the operation allowing flag again. To be specific, the operation allowing device 52 maintains the ON state of the operation allowing flag. With this, when the predetermined start-up condition is satisfied, the controller 51 confirms the ON state of the operation allowing flag and starts the operation of the fuel cell system 100. For example, when the user operates the key operating portion 63 of the remote controller 102 to instruct the operation start of the fuel cell system 100, and the operation start request signal is input from the control portion of the remote controller 102 to the controller 51, the controller 51 confirms the ON state of the operation allowing flag and starts the operation of the fuel cell system 100. Moreover, in a case where the fuel cell system 100 is in operation, the controller 51 continues the operation.

Next, the operation allowing device 52 again outputs to the remote controller 102 the signal which prevents the display portion 61 from displaying "Protection Operation in Progress" (Step S8). With this, the display portion 61 of the remote controller 102 does not display "Protection Operation in Progress".

Then, the process returns to "Start".

(iii) When Water Temperature is Equal to or Higher Than First Threshold

When the water temperature obtained in Step S1 is equal to or higher than the first threshold, the process proceeds from Step S2 to Step S9. In Step S9, the operation allowing flag is turned OFF. With this, even if the predetermined start-up condition is satisfied, the controller 51 does not start the operation of the fuel cell system 100. For example, even if the user operates the key operating portion 63 of the remote controller 102 to instruct the operation start of the fuel cell system 100, and the operation start request signal is input from the control portion of the remote controller 102 to the controller 51, the controller 51 does not start the operation of the fuel cell system 100. Moreover, in a case where the fuel cell system 100 is in operation, the controller 51 stops the operation.

Next, in order to inform outside that the operation of the fuel cell system is not allowed, the operation allowing device 52 outputs to the remote controller 102 a signal which causes the display portion 61 to display "Protection Operation in Progress" (Step S10). With this, since the display portion 61 of the remote controller 102 displays "Protection Operation in Progress", the user can understand the reason why the start-up and operation of the fuel cell system are not carried out.

Then, the process returns to "Start".

(iv) When Water Temperature is Temperature which has been Equal to or Higher than First Threshold or higher but Becomes Lower than First Threshold and Not Lower than Second Threshold When the water temperature obtained in Step S1 is a temperature which is lower than the first threshold and not lower than the second threshold, the process proceeds from Step S2 to Step S3. Since the water temperature is not lower than the second threshold in Step S3, the process proceeds to Step S4.

In Step S4, the operation allowing device 52 determines whether or not the operation allowing flag is ON. As described above, when the water temperature is equal to or higher than the first threshold, the operation allowing device 52 turns OFF the operation allowing flag in Step S9. Therefore, when the water temperature which has been equal to or higher than the first threshold becomes lower than the first threshold and not lower than the second threshold, the process proceeds to Step S5 since the operation allowing flag is OFF. In Step S9, the controller 51 turns OFF the operation allowing flag and stops the operation of the fuel cell system 100.

In Step S5, the operation allowing device 52 turns OFF the operation allowing flag again. To be specific, the operation allowing device 52 maintains the OFF state of the operation allowing flag. With this, the controller 51 maintains an operation stop state of the fuel cell system 100.

Next, in order to inform outside that the operation of the fuel cell system is not allowed, the operation allowing device 52 outputs to the remote controller 102 the signal which causes the display portion 61 of the remote controller 102 to display "Protection Operation in Progress" (Step S6). With this, the display portion 61 of the remote controller 102 maintains the display of "Protection Operation in Progress".

Then, the process returns to "Start".

As above, in the fuel cell system 100 according to Embodiment 1, in a case where the operation of the fuel cell system 100 has already been allowed by the operation allowing device 52 (in a case where the operation allowing flag has been turned ON) even when the water temperature is lower than the first threshold and not lower than the second threshold, the operation allowing device 52 allows the operation of the fuel cell system 100. In contrast, after the temperature of the outside air has become the first threshold or higher, the operation allowing device 52 does not allow the operation of the fuel cell system 100 until the water temperature becomes equal to or lower than the second threshold. To be specific, the difference between the first threshold in Step S2 and the second threshold in Step S3 becomes hysteresis, and this can suppress unnecessary chattering in operation control of the operation allowing device 52.

In the present invention, a stop process is defined as an operation from when the control device 21 outputs a stop signal until when the fuel cell system 100 completes its process. Moreover, that the fuel cell system 100 stops its operation denotes a standby state from when the stop process is completed until when the next start-up command is output from the control device 21. During the standby state, the control device 21 and the outside air temperature detector 20 are operating.

Next, control of the material gas supplying device 12 and/or the igniter 82 by the controller 51 of the fuel cell system 100 according to Embodiment 1 will be explained in reference to FIG. 1.

First, when the user operates the key operating portion 63 of the remote controller 102 to instruct the operation start of the fuel cell system 100, the remote controller 102 outputs the operation start request signal to the controller 51. When the operation start request signal is input from the remote controller 102, and the operation allowing flag is ON, the controller 51 outputs a start-up command, a material supply signal to the material gas supplying device 12 to supply the material gas to the burner heater portion 81, and a combustion air supply signal to a combustion air supplying device, not shown, to supply the combustion air to the burner heater portion 81. With this, the material gas is supplied from the material gas supplying device 12 through the combustion gas supplying passage 31a to the burner heater portion 81, and the combustion air is supplied from the combustion air supplying device through the combustion air supplying passage, not shown, to the burner heater portion 81.

Next, after a predetermined time has elapsed since the controller 51 outputs respective supply signals to the material gas supplying device 12 and the combustion air supplying device, the controller 51 outputs an ignition signal to the igniter 82. With this, the igniter 82 carries out an ignition operation, and the material gas and combustion air supplied to the burner heater portion 81 combust. Thus, the combustion gas is generated.

Next, the controller 51 outputs the material gas supply signal to the material gas supplying device 12 to supply the material gas to the hydrogen generator 13. With this, the material gas is supplied from the material gas supplying device 12 to the hydrogen generator 13, and the fuel gas is generated in the hydrogen generator 13. The generated fuel gas is used in the anode 2a of the fuel cell 11. The surplus fuel gas unconsumed in the anode 2a of the fuel cell 11 is supplied to the anode off gas supplying passage 34. While the anode off gas having been supplied to the anode off gas supplying passage 34 flows through the anode off gas supplying passage 34, the steam contained in the anode off gas is condensed to water and separated from the anode off gas in the anode condenser 15. The anode off gas from which the water has been separated is supplied to the burner heater portion 81.

When the supply of the anode off gas to the burner heater portion 81 starts, the controller 51 outputs a supply stop signal to the material gas supplying device 12 to stop the supply of the material gas to the burner heater portion 81. With this, the material gas supplying device 12 stops supplying the material gas to the burner heater portion 81.

As described above, when the temperature (water temperature; outside air temperature) detected by the temperature detector 28 has become equal to or higher than the first threshold during the operation of the fuel cell system 100, the operation allowing device 52 stops the operation of the fuel cell system 100. In this case, the anode off gas whose steam partial pressure is increased remains in the anode off gas supplying passage 34. After that, when the outside air temperature has decreased, and the temperature detected by the temperature detector 28 has become lower than the second threshold, dew condensation of the liquid water from the anode off gas occurs on an inner surface of the anode off gas supplying passage 34.

Therefore, when the water temperature becomes equal to or higher than the first threshold and then becomes lower than the second threshold, the predetermined start-up condition is satisfied in a state where the operation allowing device 52 allows the operation of the fuel cell system 100, the controller 51 outputs the start-up command, and the operation of the fuel cell system 100 is restarted (restart-up), the dew condensation water is supplied to the burner heater portion 81 together with the anode off gas. When the igniter 82 just carries out the usual ignition operation (the ignition operation is carried out for a predetermined period of time, and the ignition operation is repeated for a predetermined number of times), the material gas and combustion air supplied to the burner heater portion 81 may not react with each other, and the ignition and combustion may not start promptly. In the present specification, the "usual" denotes a case except for a case where the temperature detected by the temperature detector 28 has become equal to or higher than the first threshold and then becomes lower than the second threshold.

In the fuel cell system 100 according to Embodiment 1, when restarting the operation of the fuel cell system 100, the controller 51 causes the material gas supplying device 12 and/or the igniter 82 to carry out the ignition operation as below.

In a period from after the controller 51 has output the start-up command until the igniter 82 starts the ignition operation, the controller 51 controls the material gas supplying device 12 such that the amount of material gas supplied from the material gas supplying device 12 to the burner heater portion 81 becomes larger than the amount of material gas supplied in an usual start-up process. Specifically, the controller 51 controls the material gas supplying device 12 such that the flow rate of material gas supplied to the burner heater portion 81 in the period until the ignition operation starts becomes higher than the flow rate in the usual start-up process. Simultaneously, the controller 51 controls the combustion air supplying device such that the combustion air is supplied from the combustion air supplying device through the combustion air supplying passage to the burner heater portion 81. With this, the material gas, the amount of which is larger than the amount of material gas supplied in the usual operation, is supplied to the burner heater portion 81, and the gas containing the dew condensation water supplied to the burner heater portion 81 at the time of restart-up is scavenged by the material gas and the combustion air.

Next, as with the usual case, the controller 51 causes the igniter 82 to carry out the ignition operation after a predetermined time has elapsed. As described above, since the gas containing the dew condensation water supplied to the burner heater portion 81 is scavenged by the material gas and the combustion air, the material gas and the combustion air can be combusted in the burner heater portion 81 by the ignition operation of the igniter 82. In order that the gas containing the dew condensation water supplied to the burner heater portion 81 is more adequately scavenged by the material gas and the combustion air, the controller 51 may not only control the material gas supplying device 12 such that the flow rate of the material gas becomes higher than the flow rate in the usual start-up process but also cause the igniter 82 to carry out the ignition operation after a certain time has elapsed, which is longer than a time (the above predetermined time) in which the gas is supplied to the burner heater portion 81 before the ignition operation in the usual start-up process.

With this, in a case where the temperature detected by the temperature detector 28 has become equal to or higher than the first threshold and then becomes lower than the second threshold, and the fuel cell system 200 starts up, the ignitability at the time of the ignition operation by the igniter 82 of the burner heater portion 81 improves.

The controller 51 may control the material gas supplying device 12 such that the flow rate of the material gas supplied from the material gas supplying device 12 to the burner heater portion 81 becomes equal to the flow rate in the usual start-up process, and may cause the igniter 82 to carry out the ignition operation after a certain time, which is longer than that in the usual start-up process, has elapsed from the start of the supply of the material gas from the material gas supplying device 12 (the start of the ignition operation is delayed as compared to the start of the ignition operation in the usual start-up process).

By such control, the material gas, the amount of which is larger than the amount of material gas in the usual operation, is supplied to the burner heater portion 81 until the igniter 82 starts the ignition operation. Thus, the ignitability at the time of the ignition operation by the igniter 82 of the burner heater portion 81 can be improved.

Instead of the above control method for increasing the amount of material gas supplied from the material gas supplying device 12 to the burner heater portion 81 until the igniter 82 starts the ignition operation, an ignition operating time of the igniter 82 may be increased so as to be longer than the ignition operating time in the usual start-up process. For example, the controller 51 may control the material gas supplying device 12 such that the flow rate of the material gas supplied from the material gas supplying device 12 to the burner heater portion 81 becomes equal to the flow rate in the usual operation, and the controller 51 may control the igniter 82 such that the upper limit of the number of times of retries of the ignition operation of the igniter 82 becomes higher than the upper limit in the usual operation. In this case, the igniter 82 starts the ignition operation after a predetermined time that is equal to that in the usual start-up process has elapsed since the start of the supply of the material gas from the material gas supplying device 12. Further, the controller 51 may control such that the operating time per one ignition operation is longer than that in the usual start-up process.

By such control, the ignitability at the time of the ignition operation by the igniter 82 of the burner heater portion 81 can be improved.

Operational Advantages of Fuel Cell System

Next, the operational advantages of the fuel cell system 100 according to Embodiment 1 will be explained.

As described above, as the first problem, when the temperature (water temperature; outside air temperature) detected by the temperature detector 28 has become equal to or higher than the first threshold, there is a possibility that the steam partial pressure of the anode off gas existing above the recovered water in the anode recovered water tank 26 increases, and this causes the abnormality, such as the combustion failure (ignition failure, flame failure after the start of the combustion, or the like), of the burner heater portion 81. Moreover, as the second problem, when the temperature of the water condensed in the anode condenser 15 and recovered by the anode recovered water tank 26 increases, and the temperature of the recovered water flowing through the purifier 22 exceeds the upper temperature limit of the purifier 22 (ion-exchange resin, for example), the deterioration of the purifier 22 may be accelerated.

However, in the fuel cell system 100 according to Embodiment 1, the operation allowing device 52 does not allow the operation of the fuel cell system 100 in a case where the temperature detected by the temperature detector 28 is equal to or higher than the first threshold that is higher than the standard ambient temperature.

Therefore, the occurrence of at least one of the first problem and the second problem can be suppressed. To be specific, it is possible to realize at least one of a first effect of suppressing the occurrence of the abnormality, such as the combustion failure (non-ignition abnormality, flame failure abnormality, or the like), of the burner heater portion 81 of the fuel cell system 100 and a second effect of suppressing the deterioration of the purifier 22.

In the fuel cell system 100 according to Embodiment 1, in a case where the temperature detected by the temperature detector 28 has become equal to or higher than the first threshold and become lower than the second threshold, and the fuel cell system 100 has started up again, the controller 51 controls the material gas supplying device 12 such that the amount of material gas supplied from the material gas supplying device 12 to the burner heater portion 81 until the ignition operation of the igniter 82 starts becomes larger than the amount of material gas supplied in the usual start-up process. With this, the ignitability of the burner heater portion 81 at the time of restart-up can be improved, and unnecessary operation errors (ignition failure abnormality) of the fuel cell system 100 can be suppressed. Thus, the reliability of the fuel cell system 100 can be improved.

Modification Example 1

Figure 4:
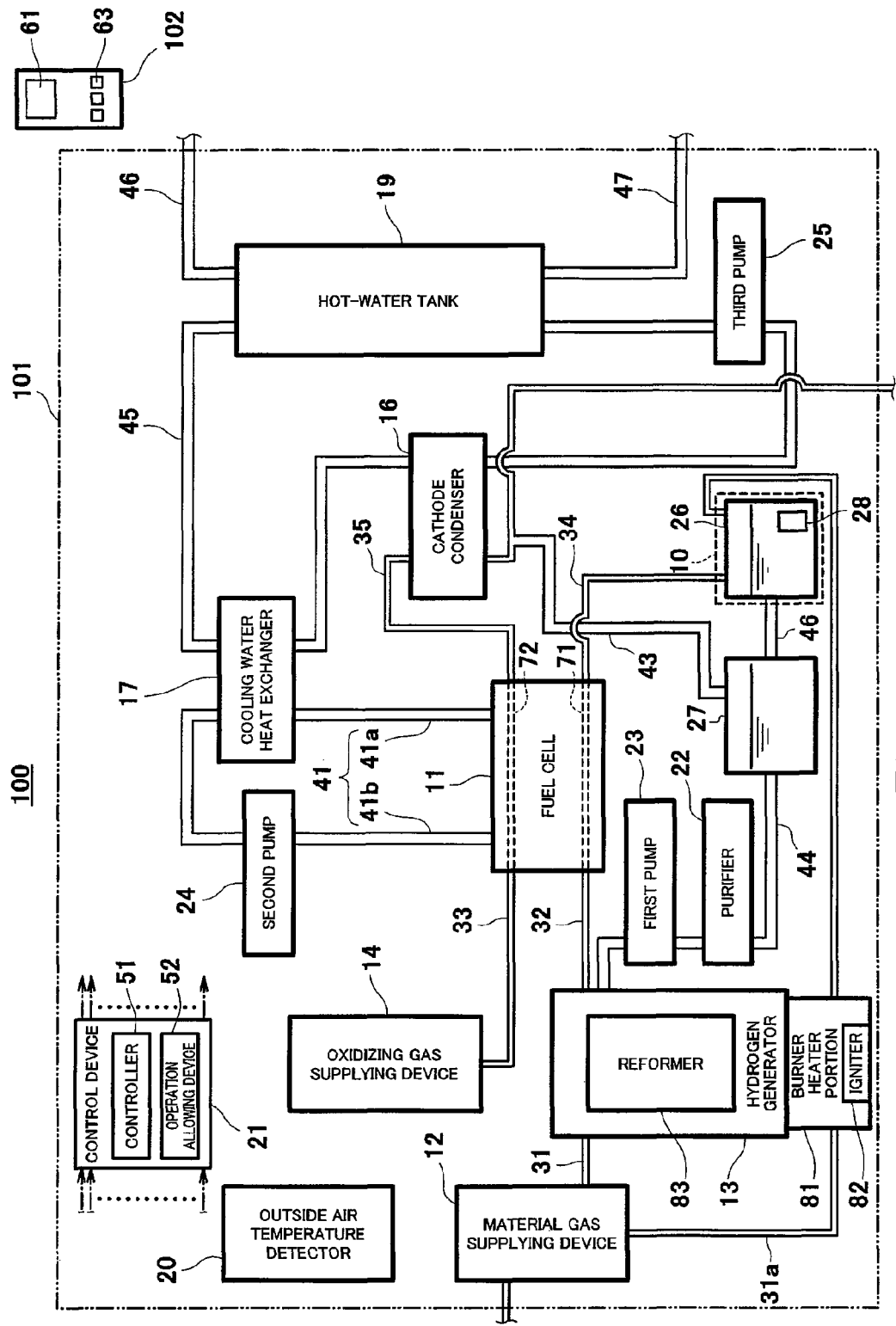
FIG. 4 is a functional block diagram of a fuel cell system according to Modification Example 1 of Embodiment 1 of the present invention.

FIG. 4 is a functional block diagram of the fuel cell system 100 according to Modification Example 1 of Embodiment 1 of the present invention.

As shown in FIG. 4, the fuel cell system 100 according to Modification Example 1 is the same in basic configuration as the fuel cell system 100 according to Embodiment 1 but is different from the fuel cell system 100 according to Embodiment 1 in that the anode condenser is not provided, and the gas-liquid separator 10 is practically constituted by the anode recovered water tank 26. Specifically, the anode off gas supplying passage 34 connects the fuel gas internal channel 71 and the burner heater portion 81 via the anode recovered water tank 26. Then, the steam contained in the anode off gas condenses while flowing through the anode off gas supplying passage 34. The condensed water is stored in the recovered water tank 26. Thus, the condensed water and the gas can be separated from each other. That is, the recovered water tank 26 serves as the gas-liquid separator.

Even the fuel cell system 100 according to Modification Example 1 configured as above has the same operational advantages as the fuel cell system 100 according to Embodiment 1.

Embodiment 2

Figure 5:
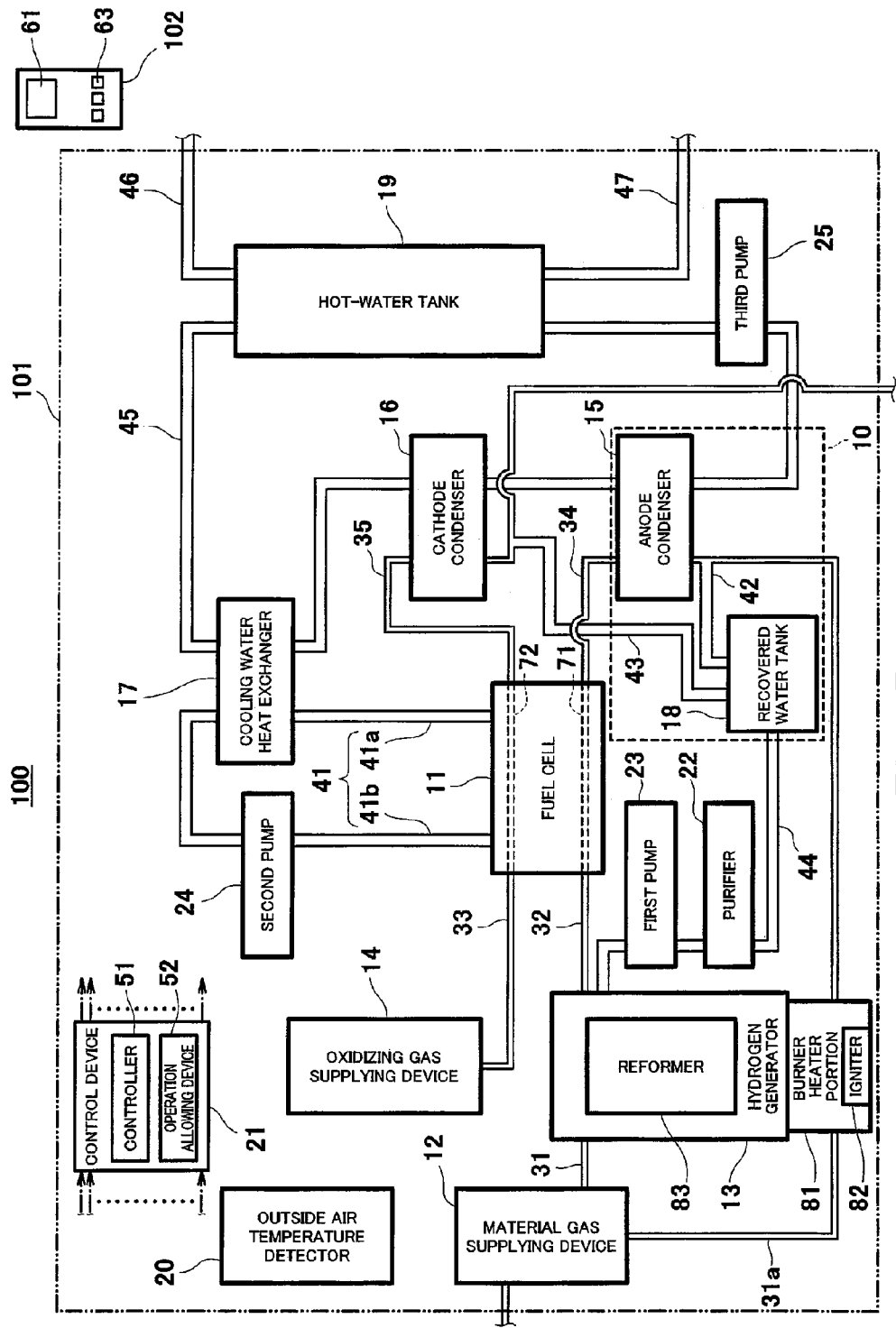
FIG. 5 is a functional block diagram of the fuel cell system according to Embodiment 2 of the present invention.
Figure 6:
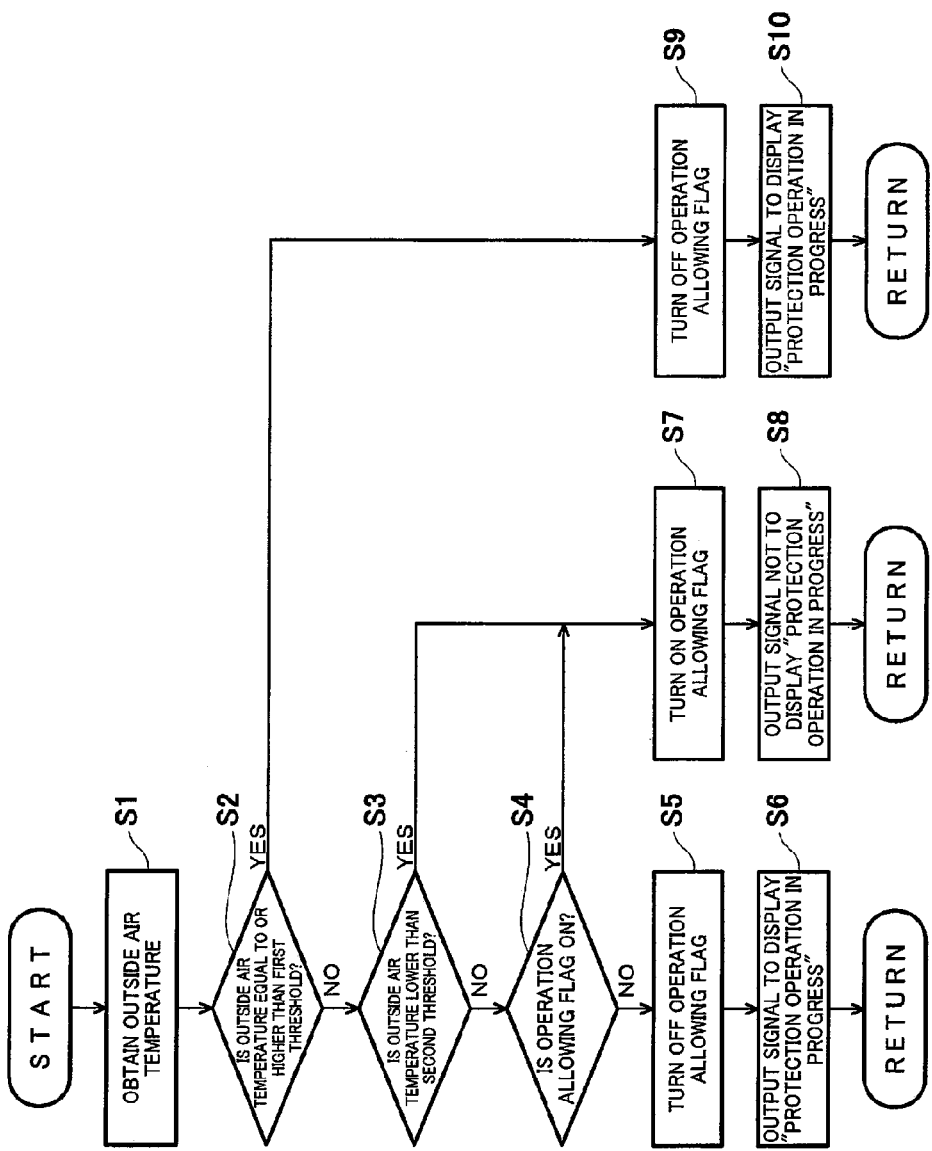
FIG. 6 is a flow chart schematically showing steps of the operation allowing process of the fuel cell system according to Embodiment 2 of the present invention.

FIG. 5 is a functional block diagram of the fuel cell system according to Embodiment 2 of the present invention. FIG. 6 is a flow chart schematically showing steps of the operation allowing process of the fuel cell system shown in FIG. 5.

As shown in FIGS. 5 and 6, the fuel cell system 100 according to Embodiment 2 of the present invention is the same in basic configuration as the fuel cell system 100 according to Embodiment 1 but is different from the fuel cell system 100 according to Embodiment 1 in that two tanks that are the anode recovered water tank 26 and the cathode recovered water tank 27 are replaced with one recovered water tank 18. Moreover, by providing the recovered water tank 18, an anode recovered water channel 42 connecting the anode off gas supplying passage 34 and the recovered water tank 18 is provided downstream of the anode condenser 15 on the anode off gas supplying passage 34. Further, the cathode recovered water channel 43 connecting the oxidizing gas discharging passage 35 and the recovered water tank 18 (herein, the anode recovered water channel 42) is provided downstream of the cathode condenser 16 on the oxidizing gas discharging passage 35.

With this, the water condensed in the anode condenser 15 is separated from the gas at a branch point where the anode off gas supplying passage 34 and the anode recovered water channel 42 branch, and the water flows through the anode recovered water channel 42 to be stored in the recovered water tank 18 as the recovered water. Moreover, the water condensed in the cathode condenser 16 is separated from the gas at a branch point where the oxidizing gas discharging passage 35 which is open to the atmosphere and the cathode recovered water channel 43 branch, and the water flows through the cathode recovered water channel 43 to be stored in the recovered water tank 18 as the recovered water.

As shown in FIG. 5, the fuel cell system 100 according to Embodiment 2 is configured such that: the temperature detector 28 is not provided; the outside air temperature detected by the outside air temperature detector 20 is detected as an alternative for the temperature of the water stored in the water reservoir (herein, the recovered water tank 18); and the control device 21 obtains the outside air temperature detected by the outside air temperature detector 20. Then, the operation allowing device 52 obtains the outside air temperature detected by the outside air temperature detector 20 and determines, as with Embodiment 1, whether to allow the operation of the fuel cell system 100 based on whether or not the obtained outside air temperature is equal to or higher than the first threshold. The first threshold set for the temperature detected by the outside air temperature detector 20 is suitably set as with Embodiment 1 so as to satisfy at least one of the first condition and the second condition.

Even the fuel cell system 100 according to Embodiment 2 configured as above has the same operational advantages as the fuel cell system 100 according to Embodiment 1.

Embodiment 3

The fuel cell system according to Embodiment 3 of the present invention is the same in basic configuration as the fuel cell system 100 according to Embodiment 2 but is different from the fuel cell system 100 according to Embodiment 2 in that the operation control of the operation allowing device 52 is different, and the remote controller 102 also serves as an abnormality alarm. The fuel cell system according to Embodiment 3 will be explained below.

Figure 7:
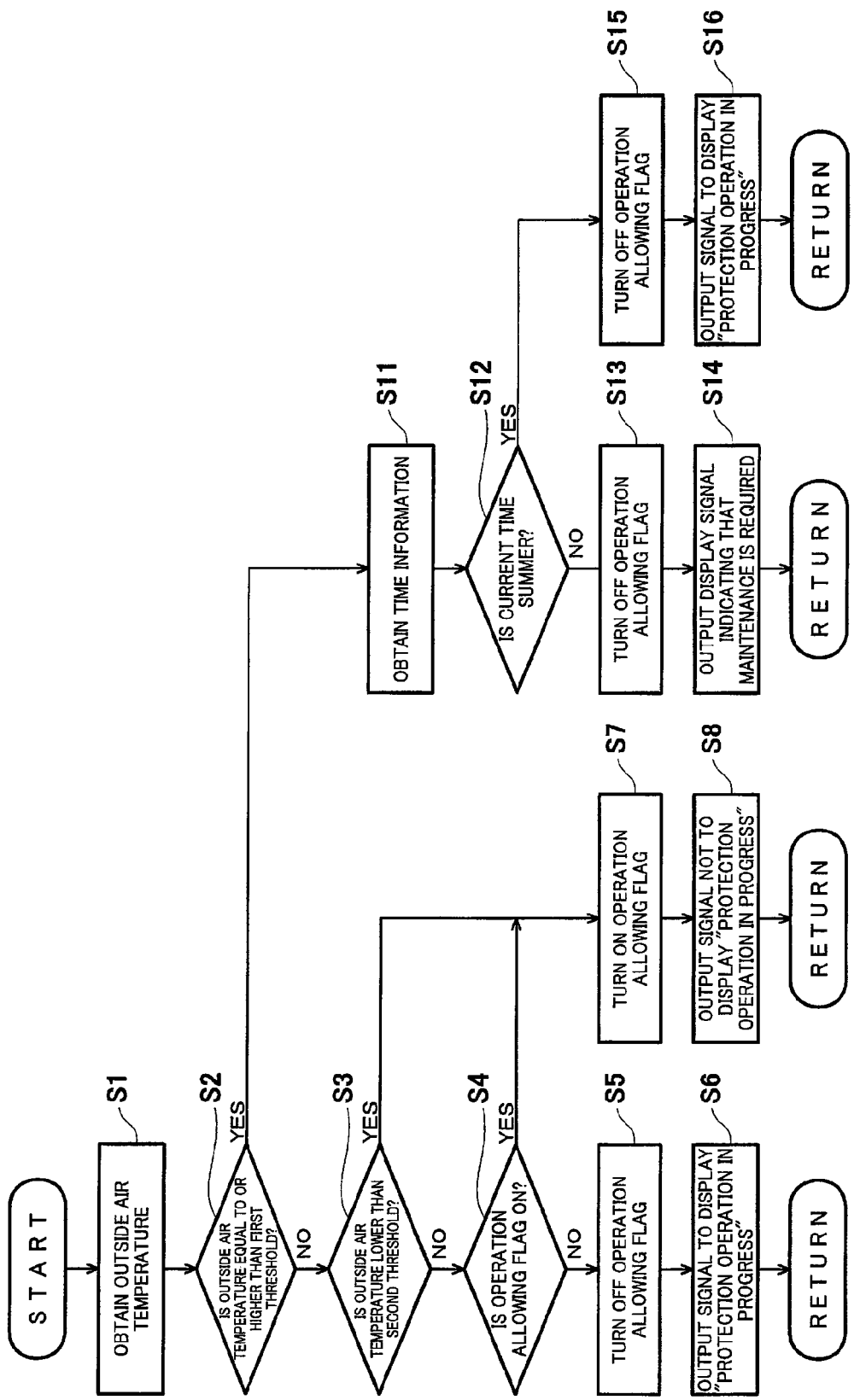
FIG. 7 is a flow chart schematically showing steps of the operation allowing process of the fuel cell system according to Embodiment 3 of the present invention.
Figure 8:
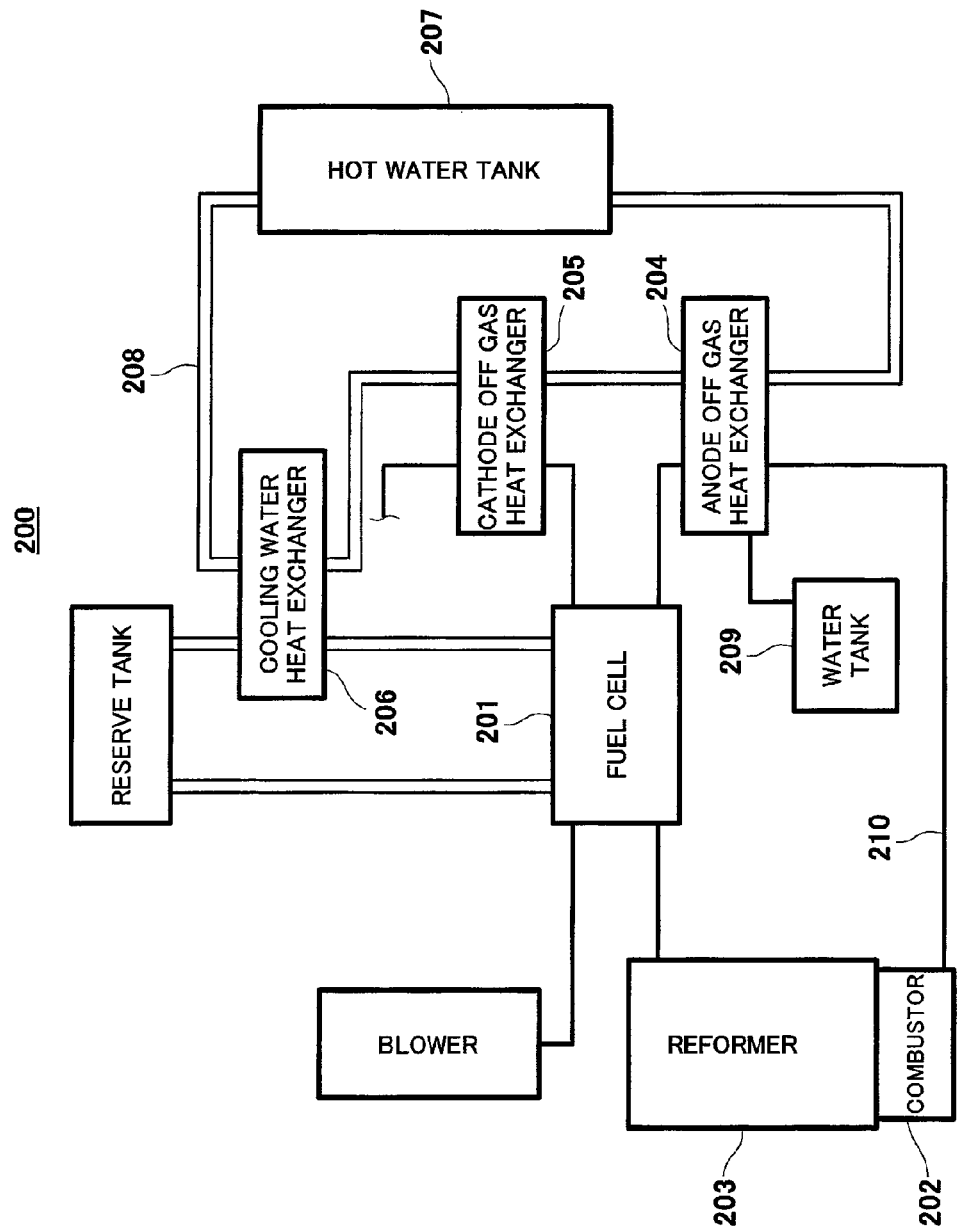
FIG. 8 is a schematic diagram showing a schematic configuration of the fuel cell power generating system disclosed in Patent Document 1.
Figure 9:
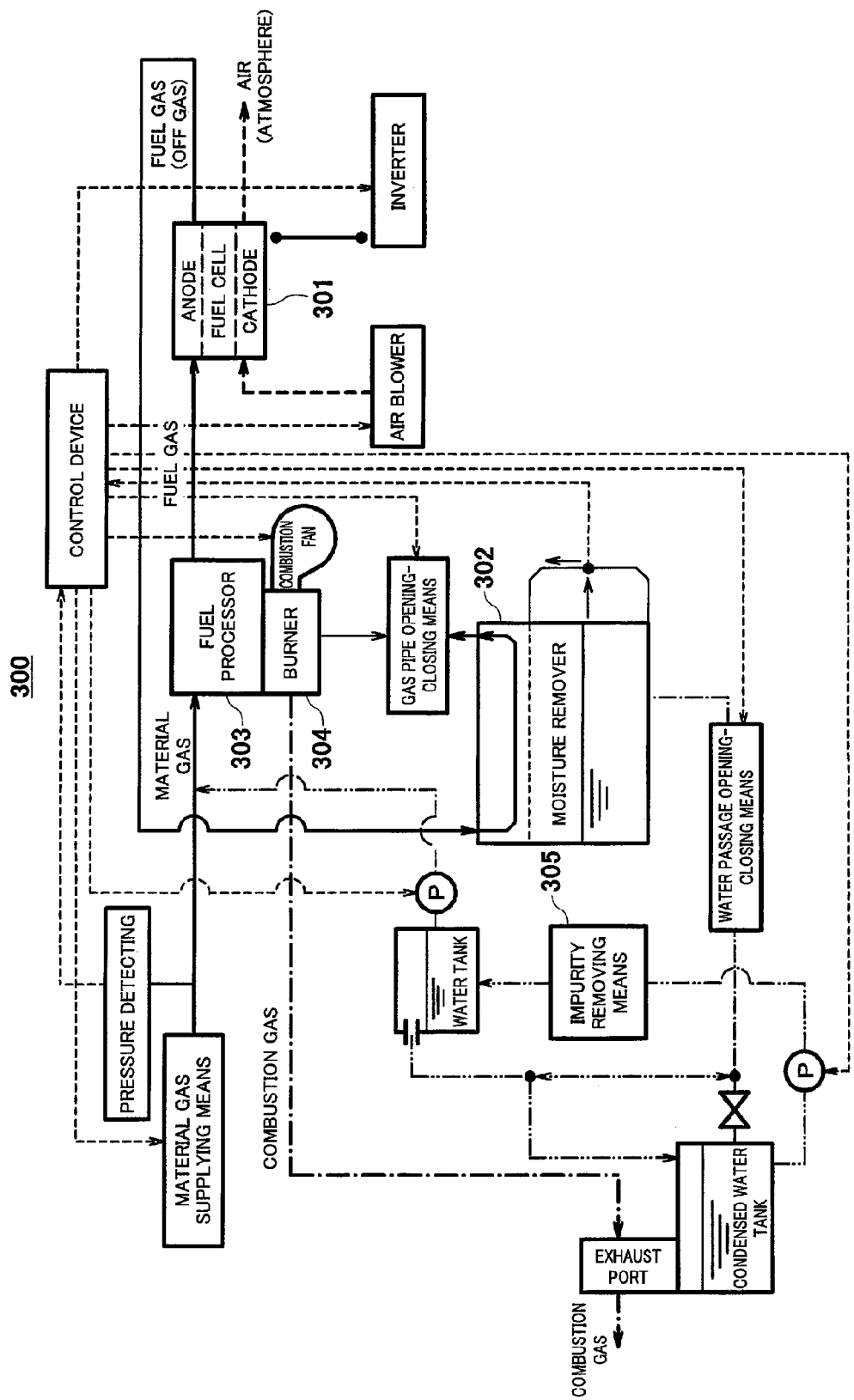
FIG. 9 is a schematic diagram showing a schematic configuration of the fuel cell system disclosed in Patent Document 2.

FIG. 7 is a flow chart schematically showing steps of the operation allowing process of the fuel cell system according to Embodiment 3.

As shown in FIG. 7, the process carried out by the fuel cell system according to Embodiment 3 when the outside air temperature has become equal to or higher than the first threshold is different from the process carried out by the fuel cell system 100 according to Embodiment 2 when the outside air temperature has become equal to or higher than the first threshold.

Specifically, when the outside air temperature obtained in Step S1 is equal to or higher than the first threshold, the process proceeds from Step S2 to Step S11. In Step S11, the operation allowing device 52 obtains a current time from the clock portion. Then, the operation allowing device 52 determines whether or not time information obtained in Step S11 corresponds to summer (from July to September, for example) stored in the storage portion (Step S12).

When the current time corresponds to the summer, the operation allowing flag is turned OFF (Step S15). With this, even when the predetermined start-up condition is satisfied, the controller 51 does not start the operation of the fuel cell system 100. For example, even when the user operates the key operating portion 63 of the remote controller 102 to instruct the operation start of the fuel cell system 100, and the operation start request signal is input from the control portion of the remote controller 102 to the controller 51, the controller 51 does not start the operation of the fuel cell system 100. Moreover, in a case where the fuel cell system 100 is in operation, the controller 51 stops the operation.

Next, in order to inform outside that the operation of the fuel cell system is not allowed, the operation allowing device 52 outputs to the remote controller 102 the signal which causes the display portion 61 to display "Protection Operation in Progress" (Step S16). With this, since the display portion 61 of the remote controller 102 displays "Protection Operation in Progress", the user can understand the reason why the start-up and operation of the fuel cell system 100 are not carried out.

Then, the process returns to "Start".

In contrast, when the current time does not correspond to the summer, the operation allowing device 52 turns OFF the operation allowing flag (Step S13). With this, even when the predetermined start-up condition is satisfied, the controller 51 does not start the operation of the fuel cell system 100. For example, even when the user operates the key operating portion 63 of the remote controller 102 to instruct the operation start of the fuel cell system 100, and the operation start request signal is input from the control portion of the remote controller 102 to the controller 51, the controller 51 does not start the operation of the fuel cell system 100. Moreover, in a case where the fuel cell system 100 is in operation, the controller 51 stops the operation.

Next, the operation allowing device 52 outputs a signal which causes the display portion 61 of the remote controller 102 to display that there is a high possibility that a predetermined device in the fuel cell system is broken, and maintenance is required (Step S14).

With this, the display portion 61 displays that the abnormality requiring maintenance has occurred in the fuel cell system 100. Moreover, in a case where the control portion of the remote controller 102 receives from the operation allowing device 52 an abnormality display signal corresponding to the abnormality requiring maintenance, it outputs to a maintenance company a signal which informs that the abnormality has occurred in the fuel cell system 100. To be specific, the remote controller 102 serves as an abnormality alarm. Herein, the remote controller 102 is configured to serve as the abnormality alarm. However, the present embodiment is not limited to this. The communication portion of the control device 21 may be configured to serve as the abnormality alarm. To be specific, the communication portion of the control device 21 may be configured to directly output to the maintenance company the signal which informs that the abnormality has occurred in the fuel cell system 100.

Then, the operation allowing device 52 terminates the present process.

As above, in Embodiment 3, since the temperature detected by the outside air temperature detector 20 is unlikely to become equal to or higher than the first threshold in a season other than the summer, it is determined that the fuel cell system 100 is broken. Thus, the maintenance, such as quick troubleshooting, can be carried out.

In the above embodiments, as the temperature of the anode recovered water tank 26, the temperature detector 28 detects the temperature of the recovered water stored in the anode recovered water tank 26. However, the above embodiments are not limited to this. For example, as the temperature of the anode recovered water tank 26, the temperature of the recovered water stored in the cathode recovered water tank 27 may be detected. Moreover, the temperature of the anode recovered water tank 26 may be calculated based on the temperature of the cooling water circulating in the cooling water circulating passage 41. Further, in a case where the heat medium circulating in the exhaust heat recovery circulating passage 45 is water, the temperature of the anode recovered water tank 26 may be presumed based on the temperature of the water. To be specific, the temperature detector 28 may be provided anywhere as long as it can detect the temperature of the water in the water passage in the fuel cell system.

In the above embodiments, the temperature detector 28 is constituted by a thermistor. However, the above embodiments are not limited to this. The temperature detector 28 may be constituted by a thermocouple. Moreover, the outside air temperature detector 20 is constituted by a thermistor. However, the above embodiments are not limited to this. The outside air temperature detector 20 may be constituted by a thermocouple. As long as the outside air temperature detector 20 can detect a temperature correlated to the outside air temperature, it may be arranged anywhere in the fuel cell system 100 (inside the casing 101) or may be arranged outside the fuel cell system (on an outer side, such as an outer wall surface of the casing 101). Further, an outside air temperature obtaining device configured to obtain the outside air temperature from outside by a communication signal may be configured instead of providing a thermocouple, a thermistor, or the like as the outside air temperature detector 20.

In the above embodiments, the allowance or disallowance of the operation of the fuel cell system 100 is determined such that the operation allowing device 52 turns ON or OFF the operation allowing flag, and the controller 51 confirms that the operation allowing flag is ON or OFF and outputs the start-up command. However, the above embodiments are not limited to this. For example, the fuel cell system 100 may be configured such that: in the start-up of the fuel cell system 100, the controller 51 outputs the start-up command regardless of ON or OFF of the operation allowing flag; when the operation is not allowed, the operation allowing device 52 blocks the start-up command output from the controller 51, thereby executing the operation disallowance; and when the operation is allowed, the operation allowing device 52 does not block the start-up command output from the controller 51, thereby executing the operation allowance. Moreover, the fuel cell system 100 may be configured such that: during the operation of the fuel cell system 100, the controller 51 outputs an operation continuation signal regardless of ON or OFF of the operation allowing flag; when the operation is not allowed, the operation allowing device 52 blocks the operation continuation signal output from the controller 51, thereby executing the operation disallowance (to be specific, stopping the operation of the fuel cell system 100); and when the operation is allowed, the operation allowing device 52 does not block the operation continuation signal, thereby executing the operation allowance (to be specific, continuing the operation of the fuel cell system 100).

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The fuel cell system of the present invention can suppress non-ignition abnormality and flame failure abnormality which are caused by the increase in a steam content of the anode off gas in the burner heater portion of the reformer when the fuel cell system starts up under high-temperature environment or when the outside air temperature increases and high-temperature environment is realized during the operation of the fuel cell system. Therefore, the fuel cell system of the present invention is useful in a technical field of fuel cells.

In addition, the fuel cell system of the present invention can prevent the water having a temperature higher than the upper temperature limit of the ion-exchange resin from being supplied to the purifier when the fuel cell system starts up under high-temperature environment or when the outside air temperature increases and high-temperature environment is realized during the operation of the fuel cell system. Therefore, the fuel cell system of the present invention is useful in the technical field of fuel cells.

The invention claimed is:

1. A fuel cell system comprising:
    a fuel cell configured to generate electric power using a fuel gas and an oxidizing gas;
    an anode off gas channel through which an anode off gas discharged from an anode of the fuel cell flows;
    a gas-liquid separator disposed on the anode off gas channel to separate moisture from the anode off gas, and including a water reservoir configured to store the separated moisture as water;
    a temperature detector configured to detect a temperature of the water in the water reservoir; and
    an operation allowing device including a computer and a memory storing a program,
    wherein the program, when executed by the computer, causes the operation allowing device not to allow an operation of the fuel cell system in a case where the temperature detected by the temperature detector is equal to or higher than a first threshold that is higher than a standard ambient temperature.

2. The fuel cell system according to claim 1, further comprising a hydrogen generator including a reformer configured to generate the fuel gas from a material by a reforming reaction and a combustor configured to combust the anode off gas supplied through the anode off gas channel to heat the reformer, wherein the first threshold is a water temperature at which a dew point of the anode off gas existing above the water in the water reservoir is presumed to become equal to or higher than a dew point at which the combustor causes a flame failure.

3. The fuel cell system according to claim 1, further comprising:
a water utilizing device configured to utilize the water in the water reservoir; and
a purifier configured to purify the water supplied from the water reservoir to the water utilizing device, wherein
the first threshold is a temperature equal to or lower than an upper temperature limit of the purifier.

4. The fuel cell system according to claim 1, further comprising a water channel including the water reservoir, wherein
the temperature detector includes a water temperature detector configured to detect the temperature of the water in the water channel.

5. The fuel cell system according to claim 1, wherein the temperature detector includes an outside air temperature detector configured to detect an outside air temperature.

6. The fuel cell system according to claim 1, wherein the program causes the operation allowing device to allow the operation of the fuel cell system in a case where the temperature detected by the temperature detector is lower than a second threshold that is lower than the first threshold.

7. The fuel cell system according to claim 6, wherein the program causes the operation allowing device to allow the operation of the fuel cell system in a case where the temperature detected by the temperature detector before start-up of the fuel cell system is lower than first threshold and not lower than the second threshold, and the operation allowing device has already allowed the operation of the fuel cell system.

8. The fuel cell system according to claim 1, wherein the program causes the operation allowing device not to allow the operation of the fuel cell system until the temperature detected by the temperature detector becomes lower than a second threshold that is lower than the first threshold after the temperature detected by the temperature detector has become equal to or higher than the first threshold.

9. The fuel cell system according to claim 2, further comprising:
a material gas supplying device configured to supply the material to the reformer or the combustor;
an igniter included in the combustor; and
a controller, wherein:
the combustor is configured to combust the material gas supplied from the material gas supplying device in a start-up process, and
in the start-up of the fuel cell system after the operation allowing device has allowed the operation of the fuel cell system in a case where the temperature detected by the temperature detector has become equal to or higher than the first threshold and then becomes lower than a second threshold that is lower than the first threshold, the controller is programmed to control at least one of the material gas supplying device and the igniter such that a larger amount of material gas than usual is supplied to the combustor before an ignition operation of the igniter.

10. The fuel cell system according to claim 9, wherein the controller is programmed to control the material gas supplying device such that a flow rate of the material gas supplied to the combustor becomes higher than usual.

11. The fuel cell system according to claim 9, wherein the controller is programmed to cause the igniter to set a timing of the ignition operation later than a normal timing of the ignition operation.

12. The fuel cell system according to claim 2, further comprising:
a material gas supplying device configured to supply the material to the reformer or the combustor;
an igniter included in the combustor; and
a controller, wherein:
the combustor is configured to combust the material gas supplied from the material gas supplying device in a start-up process, and
in the start-up of the fuel cell system after the operation allowing device has allowed the operation of the fuel cell system in a case where the temperature detected by the temperature detector has become equal to or higher than the first threshold and then becomes lower than a second threshold that is lower than the first threshold, the controller is programmed to control the igniter such that an ignition operating time of the igniter becomes longer than that of a normal ignition operation.

13. The fuel cell system according to claim 1, further comprising a breakdown alarm configured to inform that the fuel cell system is broken in a case where the temperature detected by the temperature detector become equal to or higher than the first threshold in a season other than summer.

14. The fuel cell system according to claim 1, further comprising a disallowing alarm configured to inform disallowance of the operation of the fuel cell system in a case where the operation allowing device does not allow the operation of the fuel cell system.

* * * * *